United States Patent [19]

Gajewski

[11] Patent Number: 4,934,753
[45] Date of Patent: Jun. 19, 1990

[54] ELECTRICAL CONNECTORS FOR USE WITH A RETRACTABLE SUNROOF CONTAINING ELEMENTS THAT RESPOND TO AN APPLIED ELECTRICAL SIGNAL

[75] Inventor: Kenneth J. Gajewski, Woodhaven, Mich.

[73] Assignee: Ford Motor Company, Dearborn, Mich.

[21] Appl. No.: 253,660

[22] Filed: Oct. 5, 1988

[51] Int. Cl.$^5$ .............................................. B60J 7/04
[52] U.S. Cl. ..................................... 296/216; 296/211; 296/215; 350/331 R
[58] Field of Search ................ 296/211, 215, 216, 223; 350/331 R, 334, 336; 200/61.71, 61.72, 61.73, 61.74, 61.75, 61.81, 61.82

[56] References Cited

U.S. PATENT DOCUMENTS

| | | | |
|---|---|---|---|
| 1,928,691 | 10/1933 | Huddleson | 200/61.82 X |
| 2,511,955 | 6/1950 | West | 200/61.73 X |
| 3,056,628 | 10/1962 | Golde | 296/219 |
| 3,545,806 | 12/1970 | Ventre | 296/223 |
| 4,329,594 | 5/1982 | Bohm | 296/223 X |
| 4,422,687 | 12/1983 | Kaltz et al. | 296/223 X |
| 4,436,338 | 3/1984 | Jardin | 296/223 |
| 4,456,335 | 6/1984 | Mumford | 350/331 R |
| 4,468,063 | 8/1984 | Yukimoto et al. | 296/223 |
| 4,475,031 | 10/1984 | Mockovciak, Jr. | 350/331 R X |
| 4,561,691 | 12/1985 | Kawai et al. | 296/216 |
| 4,626,025 | 12/1986 | Haecker et al. | 296/223 X |
| 4,641,922 | 2/1987 | Jacob | 350/334 X |
| 4,659,141 | 4/1987 | Masuda et al. | 296/223 |
| 4,688,895 | 8/1987 | Jacob | 350/332 |
| 4,749,261 | 6/1988 | McLaughlin et al. | 350/334 X |

OTHER PUBLICATIONS

1987 Taurus/Sable Shop Manual, section 46-07, "MoonRoof, Electric", pp. 46-07-1 through 46-07-8.

*Primary Examiner*—Charles A. Marmor
*Assistant Examiner*—Brian L. Johnson

[57] ABSTRACT

Electrical connectors for providing direct connection of the output of a dedicated power supply to a movable sunroof panel when the panel is within a limited distance that extends from its fully closed position. Such connections are made and broken to a sunroof panel that utilizes electrically activated light transmittance control materials or light emitting elements. A first embodiment includes a ramped conducting surface on a relatively fixed block and a spring loaded contact element carried on the rear portion of the movable sunroof. A second embodiment contains a spring loaded contact within a bore formed in an insulator block. The block and contact are mounted in a relatively fixed position aligned with a conductive probe mounted on the rear portion of the movable sunroof. A circuit provides timing protection to the dedicated power supply by ensuring that the electrical connectors are in contact before allowing the power supply to be energized.

9 Claims, 3 Drawing Sheets

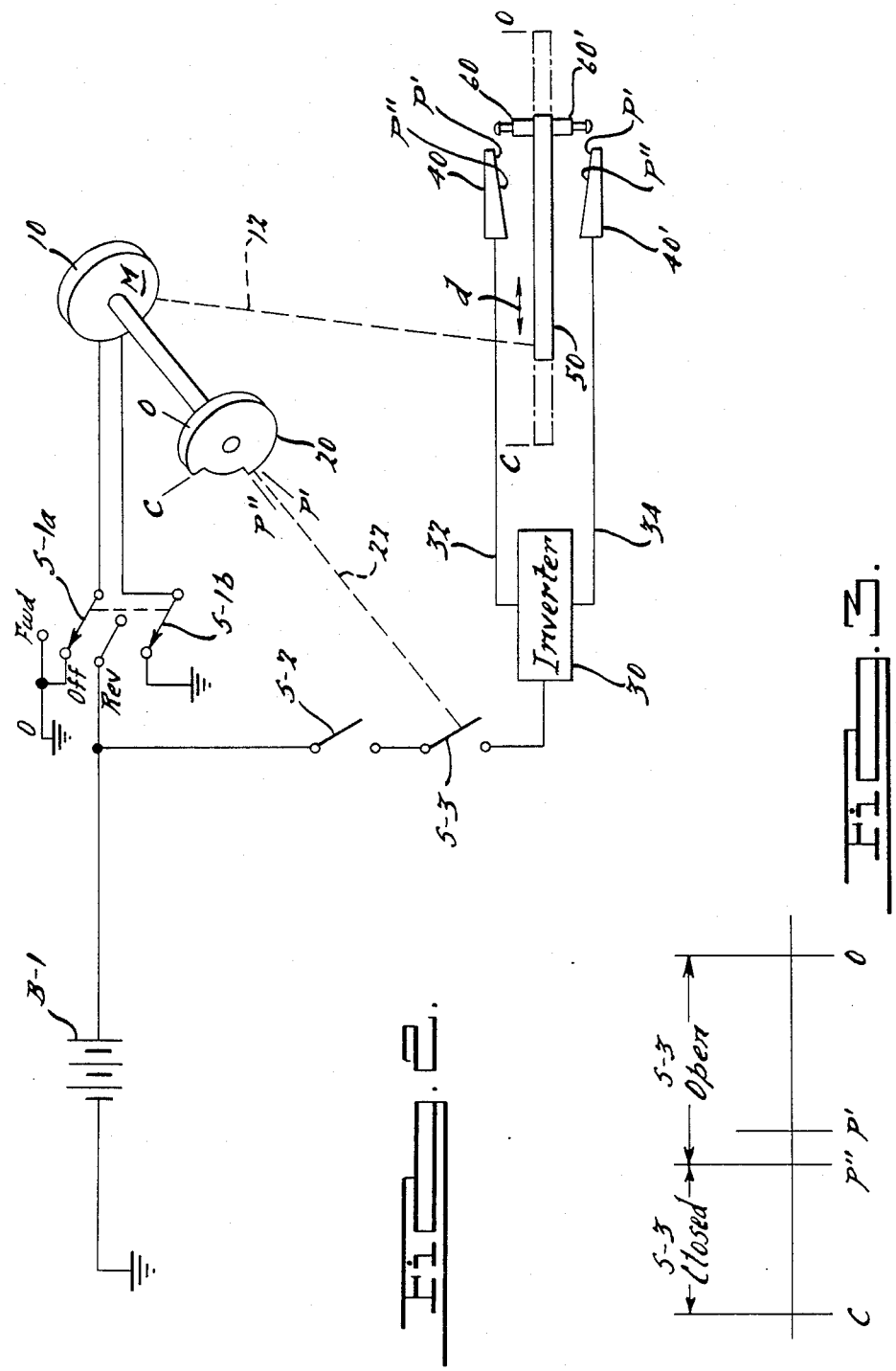

U.S. Patent Jun. 19, 1990 Sheet 3 of 3 4,934,753
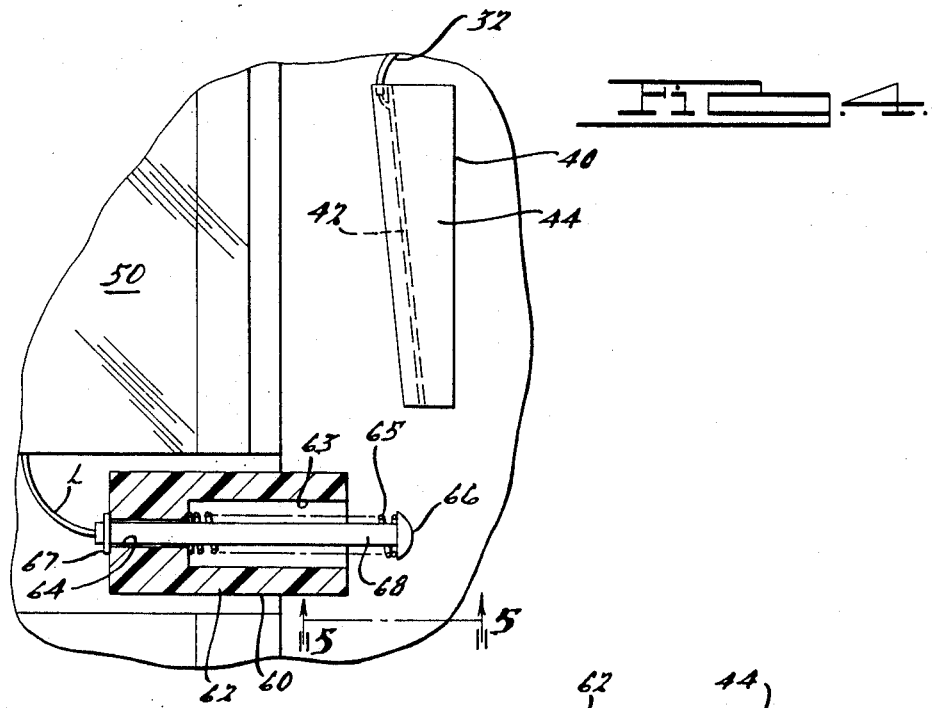
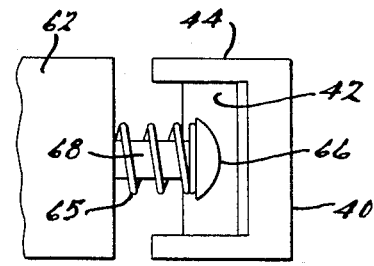
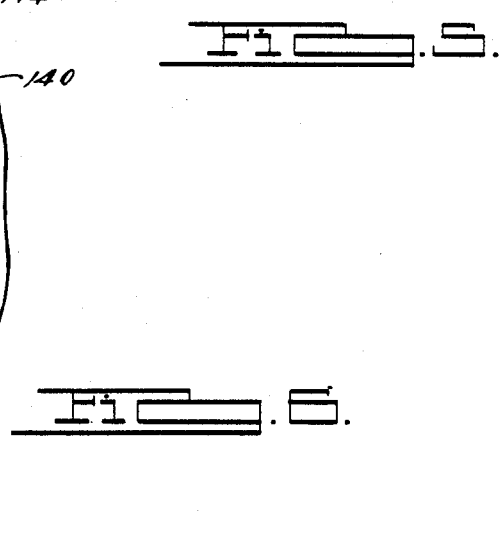

ELECTRICAL CONNECTORS FOR USE WITH A RETRACTABLE SUNROOF CONTAINING ELEMENTS THAT RESPOND TO AN APPLIED ELECTRICAL SIGNAL

RELATED APPLICATIONS

This application is related to copending application Ser. No. 253524, filed on 1988, entitled "Electrical Circuit For Protecting A Power Supply Connected To Apply Signals To A Retractable Sunroof Containing Materials That Respond To An Applied Electrical Signal", which is commonly assigned to the assignee hereof.

BACKGROUND OF THE INVENTION

1. Field of the Invention

The present invention is directed to the field of movable roof panels on automotive vehicles and more specifically to the area of providing electrical energy directly to such panels.

2. Background Information

The use of movable roof panels (sometimes referred to as sunroofs or moonroofs) on automotive vehicles is quite common and several prior art mechanisms and switches are known to provide electro/mechanical movement to open and close the panels. For instance, U.S. Pat. No. 4,659,141 and 4,468,063 describe the use of an electric motor and a mechanical linkage to move a sunroof panel between a fully closed and a fully retracted position.

U.S. Pat. No. 4,561,691 describes a safety device which detects an overload of the driving mechanism due to foreign objects being caught in the mechanism.

U.S. Pat. No. 3,056,628 describes a switching device which is disposed at the forward edge of the roof opening so that when a sliding panel on the roof is fully closed, the switch will be closed. This is used for completing an electrical circuit which inhibits the drive voltage applied to the closing motor.

U.S. Pat. No. 3,545,806 describes an electric current supply device which includes a set of pivotally-mounted, spring-loaded collector shoes carried by the movable roof panel. The collector shoes are electrically connected to an electric motor mounted on the panel and are constantly urged by a resilient device to make contact with a current supplying side bar that is fixed to the nonmovable structure.

U.S. Pat. No. 4,626,025 discloses a power operated sunroof with a pair of position switches which determine the locked position of the sunroof and control the polarity of energization to the motor for correct driving direction.

U.S. Pat. No. 4,688,895 describes the use of liquid crystal materials in various zones of a light transmitting sunroof in order to control the amount of light transmitted through the panel.

SUMMARY OF THE INVENTION

The present invention is utilized to supply electrical energy directly to a movable roof panel. The retractable sunroof panel may contain a material that is sensitive to the application of electrical energy to control the amount of light transmitted through the panel, such as a liquid crystal or an electrochromic material sandwiched between transparent electrodes on opposing surfaces. It may contain light emitting materials such as electroluminescent strips for providing interior lighting when the panel is closed.

The control of the application of electrical energy to the retractable sunroof panel in the preferred embodiment is such that the application of the electrical energy to the panel is desired to be made only when the roof panel is in its fully closed position or within a short distance therefrom. In addition, it is desired to have the electrical load of the sunroof panel electrically connected to the power source output before that power source is energized. Accordingly, electrical connections made between the power source and the movable sunroof panel are made through an electrical connector system when the panel is near, as well as in, its closed position.

The present invention achieves the desired result by providing a pair of embodiments of an electrical connector system in which a first connector portion is fixedly mounted adjacent to the movable sunroof and contains a first contact element that is directly connected to the output of an electrical power supply. The connector system further includes a second connector portion mounted to move with the sunroof between its fully opened and its closed positions, and contains a second contact element that is aligned with the first contact element when the sunroof is proximate to its closed position. There is a limited predetermined distance from the fully closed position in which the electrical connector portions make electrical contact. During that distance of electrical contact, appropriate energy can be supplied from the associated power supply to control the variable transmittance or light emitting elements on the sunroof panel.

It is therefore an object of the present invention to provide movable and stationary electrical connector elements which are aligned to provide an electrical energy connection to a movable sunroof panel when it is near its fully closed position.

It is another object of the present invention to provide a plurality of embodiments of the electrical connector system.

BRIEF DESCRIPTION OF THE DRAWINGS

FIG. 2 is an electrical circuit illustrating the use of the first embodiment of the present invention.

FIG. 3 is a position diagram used to describe the operation of the schematic shown in FIG. 2.

FIGS. 4 and 5 are detailed views of the first embodiment shown in FIGS. 1 and 2.

FIG. 6 is a detailed diagram showing a second embodiment of the invention.

DESCRIPTION OF THE PREFERRED EMBODIMENTS

Figure 1:
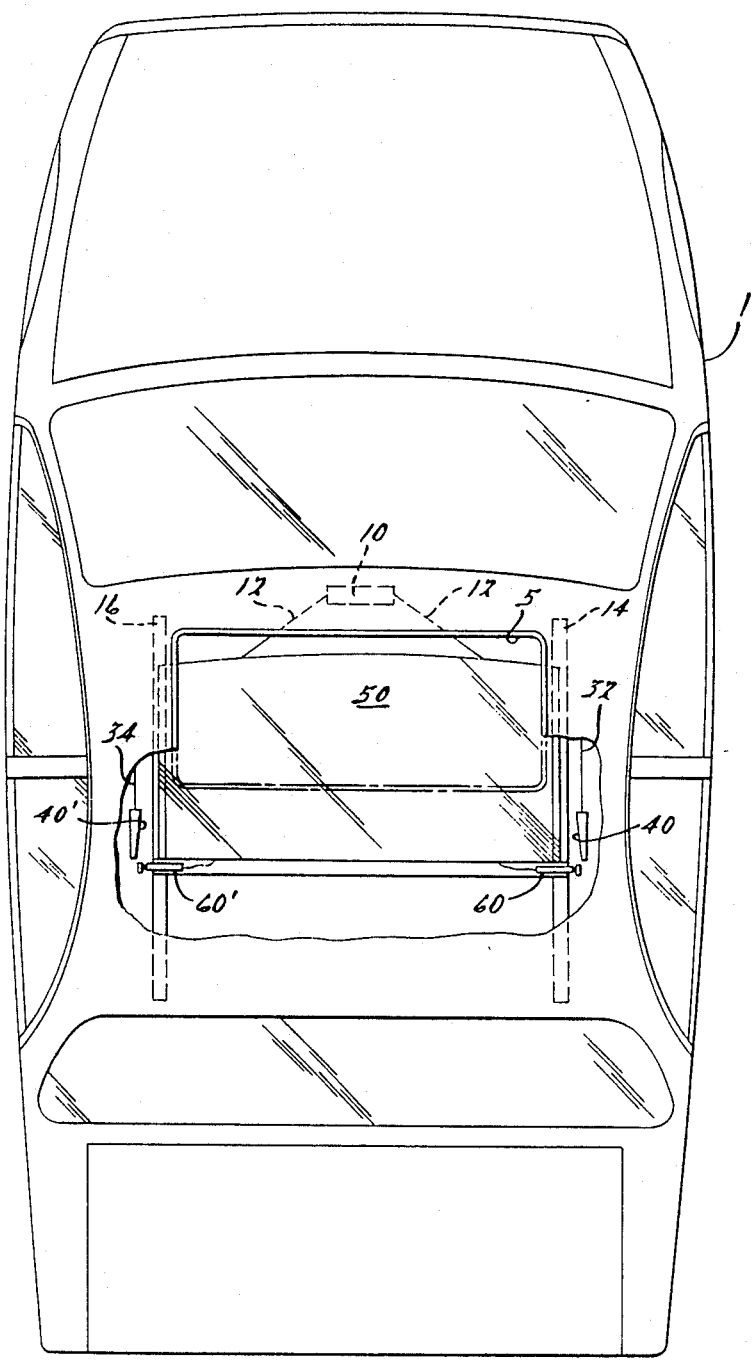
FIG. 1 is a top view of an automotive vehicle in which the first embodiment of the present invention is employed.

The vehicle 1 shown in FIG. 1 contains a roof aperture 5 which may be opened or closed by the retractable movement of a sunroof panel 50. In this case the sunroof panel 50 is linearly movable between a fully opened and a fully closed position by the use of a drive motor 10, a linkage 12 and tracks 14 and 16. The electro/mechanical mechanism employed to move the sunroof panel 50 may be of any conventional design. In this case, the electro/mechanical linkage is the same as that described in Ford Motor Company publication entitled 1987 *Tau-* rus/Sable Shop Manual, section 46-07 "MoonRoof, Electric", pages 46-07-1 through 46-07-8.

The sunroof panel 50 is of the type which contains an electrically responsive medium, such as a liquid crystal or electrochromic material sandwiched between opposing transparent conductors. In an alternative embodiment, the panel 50 may be configured with electroluminescent films that are energizable to emit light into the vehicle when an electric voltage is applied.

In the embodiment shown in FIG. 1, a pair of contact elements 40 and 40' are fixedly connected behind the aperture 5, adjacent the tracks 14 and 16. The contact elements 40, 40' are located a sufficient distance behind the aperture 5 to prevent the inadvertent contact by passengers within the vehicle. The contact elements 40 and 40' are connected through respective wires 32 and 34 to a power supply unit that is discussed below with reference to FIG. 2.

A pair of relatively movable contact elements 60 and 60' are mounted on the rearward edge of the movable panel 50 and are spaced so as to make corresponding electrical contact with the contact elements 40 and 40' when the panel 50 is positioned within a limited distance near its fully closed position.

FIG. 2 schematically represents a control circuit for supplying electrical energy to the movable sunroof panel 50. The circuit provides protection for an inverter circuit 30 by preventing the inverter 30 from being energized prior to having the electrical load connected to its output. Such a load connection is made by completing contact between connector elements 40 and 60 and 40' and 60'.

In that circuit, a battery power supply B-1 is connected to a pair of ganged switches S-1a and S-1b that control the polarity of voltage applied to a DC drive motor 10. The selection of polarity controls the directional movement of the drive motor 10. The battery B-1 is also connected to a manually actuatable switch S-2 that is in series with a cam-operated switch S-3. When both switches S-2 and S-3 are in their closed positions, the inverter 30 is supplied with power from the battery B-1 and provides an appropriate AC output signal on lines 32 and 34 to energize the electrically responsive material provided on the movable sunroof 50. (In the case where the electrically responsive material is a liquid crystal, the inverter 30 would output an AC signal of approximately 90-100 volts, 30-400 Hz. And in the case where an electroluminescent material is used, an AC voltage of 130-150 volts, 400-600 Hz is output.) Lines 32 and 34 are respectively connected to fixed contact elements 40 and 40'. Corresponding movable contact elements 60 and 60' are attached to the rearward edge of the movable sunroof panel 50 so as to make contact with the fixed contacts 40 and 40' at a point P'.

A cam 20 is shown as being rotatably connected to drive motor 10 and directly controlling the opening and closing of switch S-3 and represented by broken line 22. Broken line 12, extending between the motor 10 and the movable sunroof panel 50, represents the mechanical retraction linkage discussed above with respect to FIG. 1.

In operation, double pole switch S-1a/S-1b is manually actuated from its Off position to either a Rev. (reverse) or Fwd. (forward) position which appropriately energizes the motor 10 with a DC voltage that drives the sunroof 50 in a linear direction via its linkage 12. The cam 20 contains an upper surface which holds switch S-3 in its open condition and a stepped down surface in which the switch S-3 is closed. As the drive motor 10 rotates to drive the sunroof 50 either towards its fully open position O or its fully closed position C the cam 20 is rotated and activates the switch S-3 to be open between points O and P" and to be closed between point P" and C.

Moving from a fully opened position O towards the fully closed position C, the spring loaded contacts 60 and 60' make contact with the fixed contact elements 40 and 40' at a point P' as indicated. As the sunroof 50 continues towards the closed position, the contacts 60 and 60' continue past a point P" that corresponds to the step on the cam 20. At that point, the switch S-3 is closed to allow the manual control of the inverter 30 through switch S-2, if desired. The contacts 60 and 60' make contact with elements 40 and 40' for the remainder of the distance the sunroof moves towards its fully closed position.

The diagram in FIG. 3 illustrates the relationship of the opened and closed conditions of switch S-3 over the extent of movement of the sunroof 50. FIG. 3 illustrates the period of overlap between the point the actual load is connected to the inverter output (P') and the point at which supply voltage is allowed to be applied to the inverter 30 (P"). In accordance with the invention, the inverter 30 is prevented from outputting an energizing signal until such time as the load is connected.

FIGS. 4 and 5 offer close-up views of the connector embodiment shown in FIGS. 1 and 2.

A first portion of the connector is shown as a relatively fixed electrical contact 40. Contact 40 is formed of an insulating block 44 that contains a ramped conducting surface 42. The conducting surface 42 is connected to a leadwire 32.

A second portion of the connector is shown as relatively movable electrical contact 60. Contact 60 is formed of an insulating block 62 that is rigidly connected to the rear end of the movable sunroof panel 50. The insulator block 62 contains a central bore that extends transverse to the direction of movement of the panel 50. A first portion 63 of the bore extends from the outer end towards the center of the block 60. A second portion 64 of the bore extends from the end of bore portion 63 to the opposite end of the block 60. In the embodiment shown, bore 63 has a larger diameter than bore 64. An electrically conducting plunger 68 is mounted within the first and second bore portions 63 and 64 and has a diameter which is slightly less the bore portion 64 to allow for longitudinal movement therein. The plunger 68 contains a contact button 66 that is intended to make contact with the contact surface 42 when the sunroof panel 50 is moved towards its closed position. A spring 65 biases the plunger and contact button 66 outwardly from the block 60. A retaining ring 67 is formed on the opposite end of the plunger 68 from the contact button 66 and serves to retain the plunger and spring within the bore of the block 62. A lead wire L provides an electrical connection between the plunger 68 and the sunroof panel 50.

FIG. 6 illustrates a second embodiment of the connector that is suitable to supply electrical voltage to the movable sunroof panel. In this case the movable sunroof panel is designated 150 mounted for longitudinal movement along the vertical direction of the page. A first portion 140 of the electrical connector is rigidly connected to the vehicle and includes an insulator block 144. The block 144 contains a retractable plunger 146 that contains an enlarged end contact cap 142. The end cap 142 and the plunger 146 are formed of an electrically conducting material and are connected to a supply lead 132. The block 144 contains a central bore which is parallel to the directional movement of the panel 150 and surrounds the plunger 146. The bore includes a first portion 145 that extends from a rearward directed opening to a point near the center of the block 144, and a second portion 141 extending from the forward portion of the block 144 towards the center. The bore portion 141 is of a diameter that is smaller than bore portion 145, but large enough to accommodate the sliding motion of the plunger 146. A biasing spring 143 is located within the first portion 145 of the bore and serves to bias the plunger towards the rearward opening of the bore. A retaining ring 147 is attached to the forward end of the plunger 146 to hold the plunger within the block 144 against the biasing forces of the spring 143.

The second portion 160 of the connector is shown as containing an insulated block 164 attached to the rearward end of the sunroof panel 150. The portion 160 contains a probe 166 which extends outwardly from the block 164 and parallel to the direction of movement of the sunroof 150 in alignment with the permitted movement of plunger 146. The probe 166 is formed of a rigid metal rod that has one end embedded in the block 164 and is bent to be aligned with the enlarged end contact cap 142 of the plunger 146. An insulating sheathing material 162 is shown as surrounding a central portion of the probe 166 and may be formed of a rigid plastic material that adds stabilizing support to the probe. A lead wire L' provides an electrical connection between the probe 166 and the sunroof panel 150.

In the case of the embodiment shown in FIG. 6, the distance over which electrical contact is made between the contact elements 140 and 160, from the fully closed position of the movable sunroof panel 150, is defined by the distance that the plunger 146 is allowed to be compressed within the bore of the block 144.

Although only two embodiments of the electrical connectors have been shown in detail, it is expected that many variations of the embodiments can be made without departing from the basic concept of the invention. Accordingly, the following claims are intended to include all such variations which fall within the true spirit and scope of the invention.

I claim:

1. An electrical connector, for use with a vehicle mounted sunroof that has electrically controllable light transmittance characteristics and that is retractably mounted on said vehicle to be movable between a first fully closed position and a second fully opened position, where electrical power may be switchably applied to said sunroof when said sunroof is in its fully closed position, comprising:
    a first connector portion being relatively fixedly mounted on said vehicle adjacent to said movable sunroof and containing a first contact element that is switchably connected to an electrical power supply;
    a second connector portion mounted to move with said sunroof between its first fully opened and its second fully closed positions and containing a second contact element that is aligned with said first contact element of said first connector portion to make contact with said first contact element when said sunroof is in its closed position.

2. An electrical connector as in claim 1, wherein said second contact element is positioned on said sunroof to make contact with said first contact element over a limited predetermined distance that said sunroof moves to and from its closed position.

3. An electrical connector as in claim 2, wherein said first contacting element of said first portion contains an elongated metal surface canted towards the closed position of said sunroof and said second contacting element is spring loaded towards said metal surface to make contact prior to the closing of said sunroof and maintain said contact between said prior point of contact and the closed position.

4. An electrical connector as in claim 3, wherein said second contacting element is a plunger mounted within an insulator block for longitudinal movement in a direction that is transverse to the movement directions of said sunroof, when in contact with said metal surface of first contact element.

5. An electrical connector as in claim 2, wherein said first contacting element of said first portion is a plunger and said first portion also includes a biasing spring surrounding said plunger and an electrically insulated block containing a bore surrounding said plunger and said spring, whereby said plunger is aligned with said second contact element to make contact therewith prior to the closing of said sunroof and to maintain said contact between said prior point of contact and the closed position.

6. An electrical connector as in claim 5, wherein said second contacting element is a rigid probe extending from said sunroof in a direction parallel to the movement directions of said sunroof to make contact with said first contacting element plunger over said limited predetermined distance that said sunroof moves to and from its closed position.

7. An electrical connector as in claim 6, wherein said plunger of said first contact element contains an enlarged end that serves to retain said spring and to provide a contacting surface for contact with the probe of said second connector portion.

8. An electrical connector as in claim 7, wherein said probe comprises an exposed conducting end portion and an insulated portion, whereby said insulated portion extends from said sunroof in a direction that is transverse to the movement directions of said sunroof and contains a bend that orients the exposed end portion so that said end portion will move in a direction to contact said plunger portion over said limited distance.

9. An electrical connector as in claim 8, wherein said bore of said first connector portion is aligned with said plunger movement and said plunger is mounted in said bore to move a distance in a linear direction that corresponds to the predetermined limited distance and said probe has sufficient clearance from said bend to compress said plunger within said bore over said limited distance.

* * * * *